Figure 2:
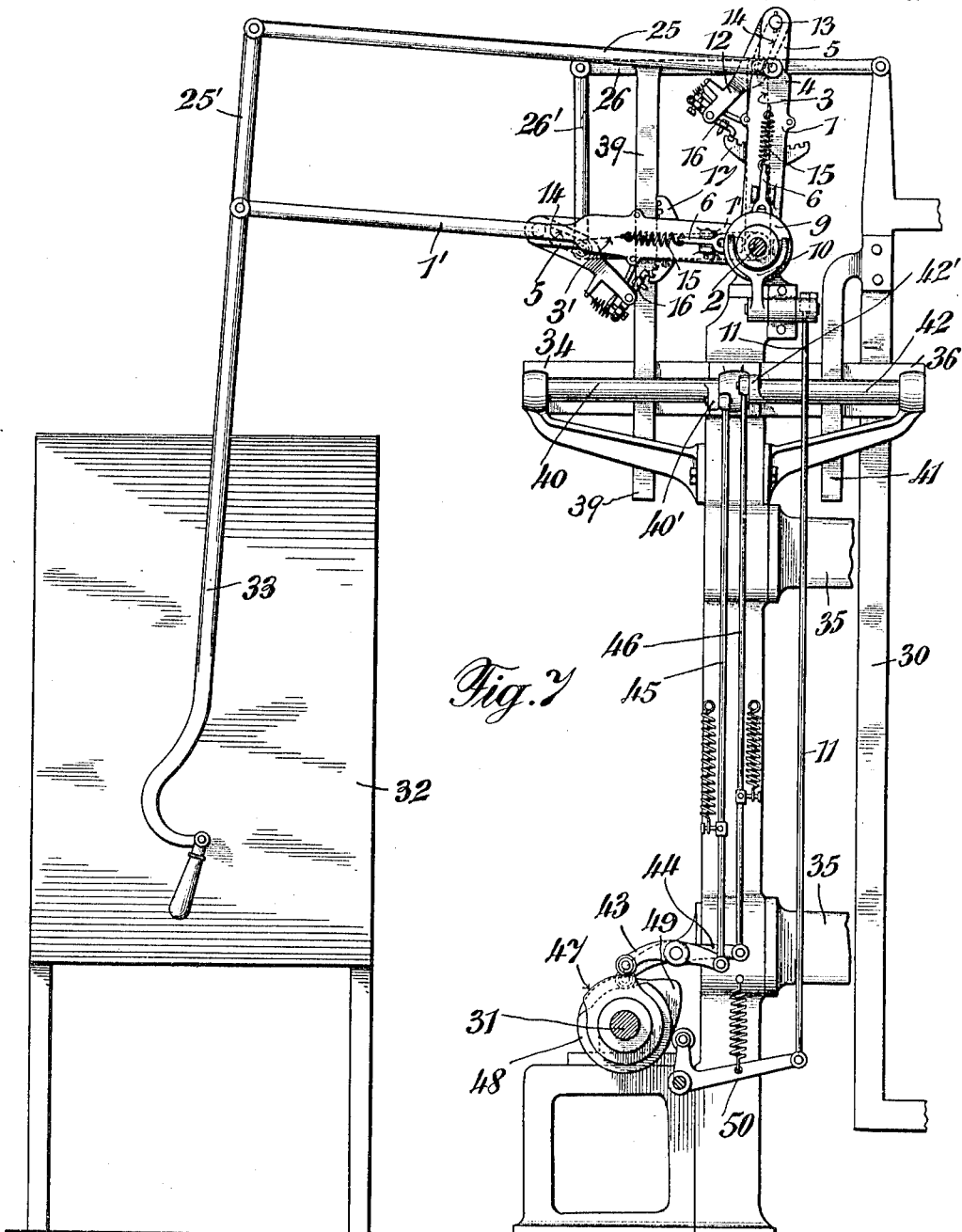

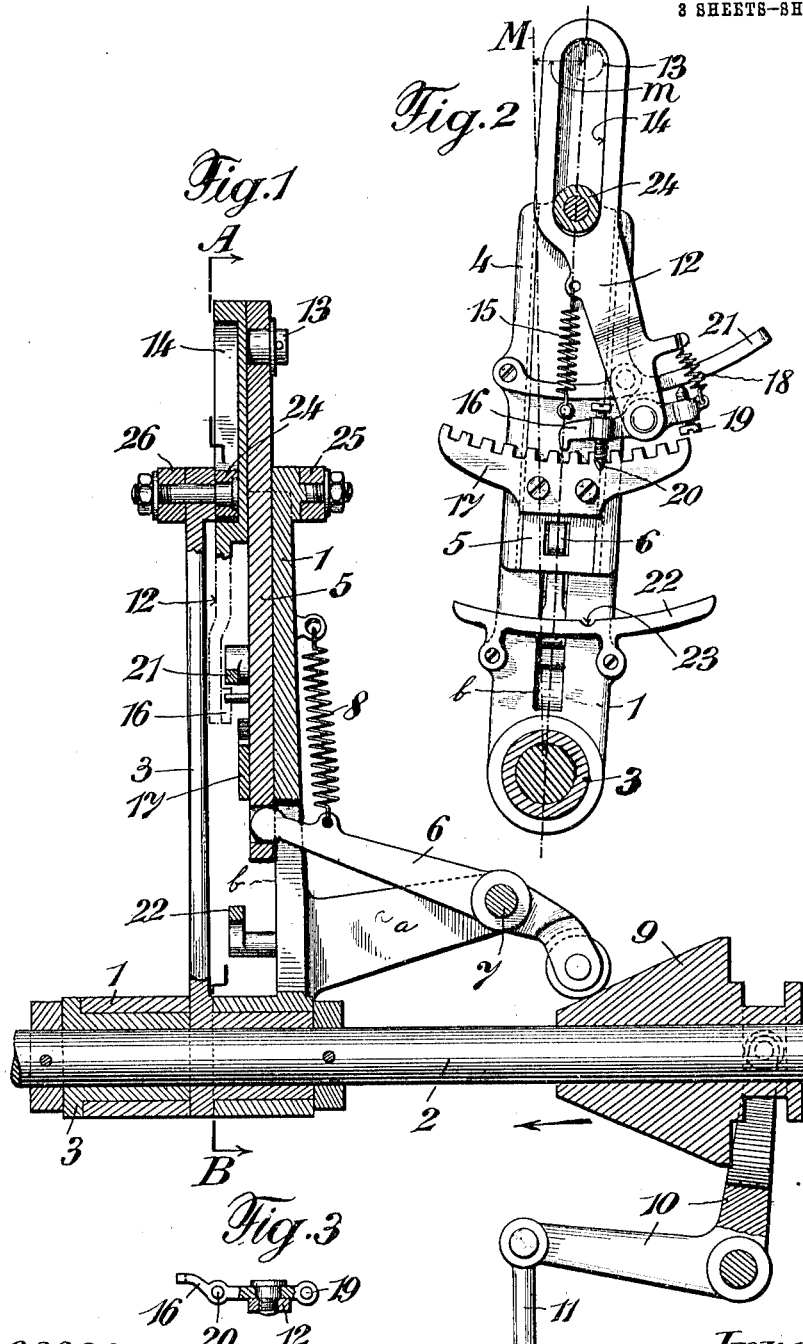

K. KELLER.
MOTION TRANSMITTING DEVICE.
APPLICATION FILED JUNE 28, 1911.
1,073,764.
Patented Sept. 23, 1913.
3 SHEETS—SHEET 2.
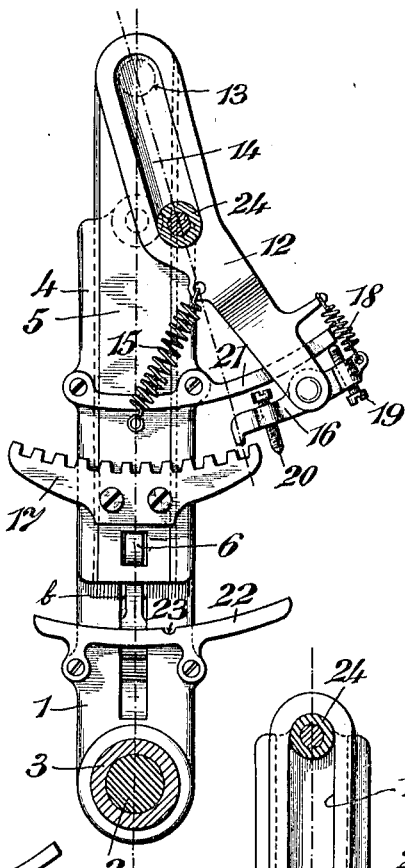
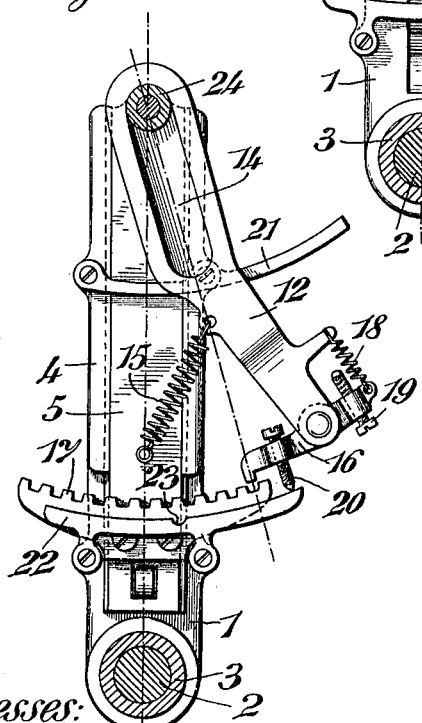
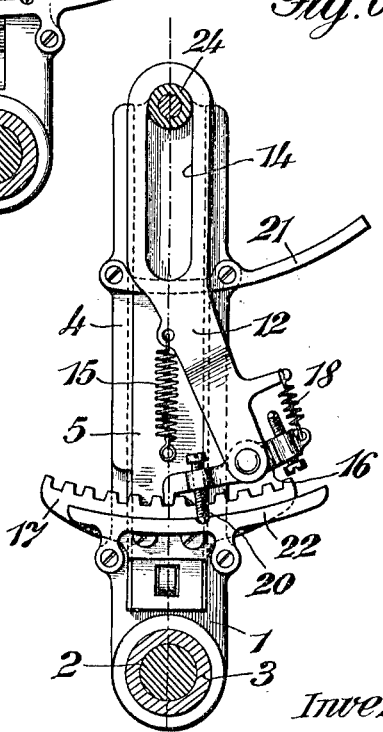
Witnesses:
BDommers
Elizabeth Leckert
Inventor:
Karl Keller,
By Henry Ortlip
Atty.

UNITED STATES PATENT OFFICE.

KARL KELLER, OF ARBON, SWITZERLAND, ASSIGNOR TO THE FIRM OF ADOLPH SAURER, OF ARBON, SWITZERLAND.

MOTION-TRANSMITTING DEVICE.

1,073,764.  Specification of Letters Patent.  Patented Sept. 23, 1913.

Application filed June 28, 1911. Serial No. 635,859.

*To all whom it may concern:*

Be it known that I, KARL KELLER, a citizen of the Republic of Switzerland, residing at Arbon, Romanshornerstrasse, Switzerland, have invented new and useful Improvements in Motion - Transmitting Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to mechanism for uniformly transmitting the movements of a member, which is variably movable and can be locked in position, to a second member, likewise movable and capable of being locked in position, such transmission taking place during a period of time of definite duration. In said mechanism there is mounted on the first member, a slide which is moved during a portion of said period of time, but only after the first member has been moved and locked in position. To this slide is connected a motion transmitting member which can be locked in angular position thereon, and which is so connected to the second member that it is moved by the second locked member, no matter whether the first member be moved a great or a small amount, after which it is locked to the slide when this latter moves. In this position and without making any idle movement, the motion transmitting member then moves the released second member positively an amount equal to that of the movement of the first member.

My invention is more especially adapted for use in embroidering machines for the uniform transmission of the movements of the pantograph, so that said pantograph may be variably moved separately from the embroidery work frame, and may be locked in position to a second parallelogram which is connected to said frame and is likewise movable and capable of being locked in position.

According to this invention two arms of the pantograph are each connected by said mechanism to two arms of a second parallelogram, each of the two mechanisms comprising a slide mounted on the arm of the pantograph, which slide is moved during a portion of the definite period of time, but only after the arm of the pantograph has been moved and locked in position, and to which a motion transmitting member, which can be locked in position thereon, is connected, and which transmitting member is so connected to the corresponding arm of the second parallelogram that said parallelogram is moved in consequence of the relative movement of the arm of the pantograph to the locked arm of the second parallelogram no matter whether the arm of the pantograph be moved a great or small amount, after which it is locked to the slide when this latter moves. In this position and without making any idle movement the motion transmitting member positively moves the released arm of the second parallelogram an amount equal to the movement of the arm of the pantograph.

The accompanying drawing illustrates by way of example a construction of mechanism, of which according to this invention two are to be used for the transmission of the movements of the pantograph to the embroidery work frame of an embroidering machine.

Figure 1 is a longitudinal section through the mechanism: Fig. 2, a section corresponding to the line A—B of Fig. 1: Fig. 3 shows a part of the mechanism in plan, and Figs. 4, 5 and 6 are similar views to Fig. 2, showing the parts in other positions. Fig. 7 illustrates the general arrangement of the mechanism employed in embroidering machines.

30 designates a part of the embroidery work frame, 31 the main shaft and 32 the pattern board of the embroidery machine. The pantograph, comprising the arms 1, 1', 25, 25', is supported by the frame 35 of the embroidery machine, said pantograph being mounted to rock about the axle 2 and be displaced according to the pattern by means of the arm 33. The second parallelogram, comprising the arms 3, 3', 26, 26', is also mounted to rock about the axle 2, and is pivotally connected to the embroidery work frame 30 by the arm 26 extended beyond its point of connection with the arm 3. The lower end of a bar 39 secured to the arm 25 of the pantograph, passes between a roller 40, eccentrically supported at both ends, and a fixed plate 34. To the embroidery work frame 30 is secured a bar 41 which passes between a roller 42, eccentrically supported at both ends, and a fixed plate 36. Levers 43 and 44 are urged by springs against cam disks 47 and 48 mounted on the main shaft 31 and actuate the rollers 40 and 42 by means of rods 45 and 46 pivotally connected at their lower ends to levers 43 and 44 and at their upper ends to arms 40' and 42' that are connected to the rollers, so that the eccentrically supported rollers 40 and 42 are caused to alternately clamp and release the bars 39 and 41.

The arms 1 and 3 as well as the arms 1' and 3' are connected to each other by motion transmitting mechanisms which are identical in construction. The arms 1 and 1' each form one of said first members, and the arms 3 and 3' each form one of said second members.

The mechanism illustrated comprises the arm 1 of the pantograph, said arm being arranged to rock about a shaft 2 and mounted on a boss of the arm 3 of the second parallelogram hereinbefore referred to, the arm 3 being also rockable about the shaft 2. The free end portion of the arm 1 is provided with a guide 4 in which a slide 5 is constrained to move longitudinally of the arm. The slide 5 is moved by means of a lever 6 which is pivoted at 7 on a bracket a projecting from the arm 1, and one arm of the lever passes through a slot b in the arm 1 and engages the slide 5, the other arm of the lever being provided with a roller that is forced by a spring 8 against a cone 9 mounted to slide upon the shaft 2. The cone 9 is actuated through a bell crank lever 10 and a rod 11 to which latter a reciprocating movement is imparted, for the purpose of moving the cone, from a cam 49 (Fig. 7) mounted on the machine shaft 31, said cam operating the rod 11 through a bell crank lever 50.

Pivoted on a pin 13 on the slide 5 is a motion transmitting member in the form of an arm or lever 12 having a recess or groove that constitutes a guide way 14. Connected to the lever 12 is a spring 15, (Fig. 2) which tends to pull the lever 12 into such a position that the guide way 14 extends in the same direction as the arm 1 and slide bar 5, as shown in Fig. 2.

The lever 12 may be locked to the slide bar 5 by means of a pawl 16 (Fig. 3) pivoted on the lower end of the lever. For coöperation with the pawl 16 there is attached to the slide bar 5 an arcuate rack 17 whose teeth are on the upper side thereof and concentric with the pin 13. The pawl 16 can snap at certain times, under the action of a spring 18, into engagement with the teeth of this rack. The pawl 16 on both sides of its pivot is provided with set screws 19 and 20. The screw 19 coöperates with a sector-shaped stop-bar 21 fixed to the guide 4 of the arm 1, and the screw 20 coöperates with a sector-shaped stop-bar 22 attached to the arm 1 below the guide 4, the arrangement being such that when the stop bar strikes against the screws, the pawl is caused to so rock as to be moved out of engagement with the toothed sector 17, so that the spring 15 can swing the lever 12 on pivot 13 to bring guide way 14 into alinement with slide 5. A notch 23 is formed on the sector 22 and adapted to receive the end of the screw 20, so that the pawl 16 may engage the rack 17.

The free end of the arm 3 is provided with a roller 24 which projects into the guide way 14 of the lever 12 (Fig. 1). A locking device is provided for the arm 1 as well as for the arm 3. The arms 25 and 26 are connected to the arms 1 and 3 respectively.

The operation of the above-described motion transmitting mechanism is as follows: The arm 1 may be rocked a variable amount to the left or to the right about the shaft 2 by the pantograph when arm 33 is moved and during a definite period of time, say forty-five seconds, for example. The cone 9 may be moved along the shaft 2 during a definite period of time only, which, however, is less than that of the movement of the arm 1, say fifteen seconds, for example, and the cone 9 is moved only after the arm 1 has been moved and locked in position. Let it be assumed that all the parts of the mechanism are in the position shown in Fig. 2. In this position the arm 1 has been moved toward the right the maximum amount m from the center line M. The pawl 16 has been forced out of engagement with the toothed sector 17 by the screw 19 bearing upon the stop bar 21, and the lever 12 with its guide-way 14 has been moved by the pull of the spring 15 into the position shown, in which the guide-way 14 extends in the same direction as the slide 5. The arm 3 is locked. If now the arm 1 be moved back during the before mentioned period of time, say forty-five seconds, out of the position shown in Fig. 2 into that shown in Fig. 4, that is to say, moved back the amount m so that its center line registers with the center line M, the lever 12 will be turned about its pivot 13 sidewise to the right out of its original position, by the roller 24 which is on the locked arm 3. After the arm 1 has been locked and the arm 3 released, the cone 9 will be moved in the direction of the arrow in Fig. 1 during the before mentioned shorter period of time, say fifteen seconds, and by this movement the slide 5 will be moved toward the shaft 2 by the lever 6. At the commencement of this downward movement of the slide 5 the pawl 16 with the screw 19 will be moved away from the stop bar 21 and caused to engage the toothed sector 17 by the spring 18, that is to say it will be locked to the slide 5 so that the lever 12 will form a rigid structure with the slide 5 and will be moved downwardly therewith. By means of the guide-way 14, which is now inclined relatively to the slide 5, the arm 3 will be positively moved by the roller 24 the amount $m$, which is the same amount that the arm 1 had been previously moved, that is to say, will be brought into line with the arm 1, see Fig. 5. Toward the end of the downward movement of the slide 5 and lever 12, the pawl 16 will again be forced out of engagement with the toothed sector 17 by the screw 20 striking against the stop bar 22, that is to say, the lever 12 will be released so that it may swing back into its original position, shown in Fig. 6, under the action of the spring 15. In this position of the lever the pawl 16 will be again allowed to engage the toothed sector 17, by the screw 20 moving into the notch 23 of the stop bar 22, see Fig. 6. If now the cone 9 be pushed back along the shaft 2 and the slide 5 be consequently forced upward by the spring 8, the lever 12 will also be carried upward while locked to the slide 5, and toward the end of the movement of the slide the pawl 16 will again be forced out of engagement with the toothed sector 17 by the screw 19 striking against the stop-bar 21, and the lever 12 will therefore be again released, (Fig. 1). If now the arm 3 be again locked and the arm 1 again released, the latter can once more be moved independently of the arm 3.

In the herein-described transmitting mechanism the transmitting member 12 is always moved, no matter whether the movement of the arm 1 be great or small, and there is no lost or idle movement, so that the transmission of the motion is effected gently and without shocks.

In application to embroidery machines for the transmission of the movements of the pantograph to the work frame, two sets of mechanism such as illustrated in Figs. 2-6 are required, that is to say, two arms 1 and 3, with a transmitting member 12, the second pair of arms 1' and 3' being likewise mounted on the shaft 2, as shown in Fig. 1.

I claim—

1. In combination a member which is variably movable and which may be locked in position, and a second member, likewise movable and capable of being locked in position, said first member arranged to transmit its movement to said second member during a period of time of definite length; a slide mounted on the first member and moved during a portion of the said period of time, but only after the movement and locking of the first member, a motion transmitting member connected to said slide and engaging with the second member so that it is moved by the said second member when locked, after which the transmitting member is locked to the slide which then moves, and without idle movement positively moves the second member which is then released by an amount equal to the movement of the first member.

2. In combination a member which is variably movable and may be locked in position, and a second member, likewise movable and capable of being locked in position, said first member arranged to transmit its movement to said second member during a period of time of definite length; a shaft, an arm constituting the first member mounted to rock on said shaft, a slide, a longitudinally extending guide for said slide on said first member, a lever pivoted to the slide having a guide-way extending from the lever pivot toward the axis of the rocking arm shaft, a spring-pressed pawl pivoted to the free end of the lever, a toothed sector attached to the slide and arranged to be engaged by said pawl, a second arm constituting said second member mounted on the shaft, and a roller mounted on said second arm and engaging the guide-way on the lever.

3. In combination a member which is variably movable and which may be locked in position, and a second member which is likewise movable and capable of being locked in position, said first member arranged to transmit its movement to said second member during a period of time of definite length; a shaft, an arm constituting the first member mounted to rock on said shaft, a slide, longitudinally-extending guide for the slide on said first member, a lever pivoted to the slide having a guide-way extending from the lever pivot toward the axis of the rocking arm shaft, a spring-pressed pawl pivoted to the free end of the lever, a toothed sector attached to the slide and arranged to be engaged by said pawl, two sector-shaped stop-bars, two screws on the pawl coöperating with said stop bars, a second arm constituting said second member mounted on said shaft, and a roller mounted on said second arm and engaging the guide-way on the lever.

4. In combination a member which is variably movable and which may be locked in position, and a second member, likewise movable and capable of being locked in position, said first member arranged to transmit its movement to said second member during a period of time definite in length; a shaft, an arm constituting the first member mounted to rock on said shaft, a slide, a longitudinally-extending guide for the slide on said first member, a lever pivoted to the slide, having a guide-way extending from the lever pivot toward the axis of the rocking arm shaft, a spring acting on said lever, a spring-pressed pawl pivoted to the free end of the lever, a toothed sector attached to the slide and arranged to be engaged by said pawl, two sector-shaped stop-bars, two screws on the pawl coöperating with said stop-bars, a second arm constituting said second member mounted on said shaft and a roller mounted on said second arm and engaging the guide way on the lever.

5. In combination a member which is variably movable and which may be locked in position, and a second member, likewise movable and capable of being locked in position, said first member arranged to transmit its movement to said second member during a period of time of definite length; a shaft, an arm constituting the first member mounted to rock on said shaft, a slide, a longitudinally-extending guide for the slide on said first member, a lever pivoted to the slide having a guide-way extending from the lever pivot toward the axis of said shaft, a spring acting on the lever, a spring-pressed pawl pivoted to the free end of the lever, a toothed sector attached to the slide and arranged to be engaged by said pawl, two sector-shaped stop bars, a notch provided in one of the stop bars, two screws on the pawl coöperating with said stop bars, a second arm constituting said second member mounted on said shaft, and a roller mounted on said second arm and engaging the guide way on the lever.

6. In combination an embroidery work frame and a pantograph which is variably movable independently of the embroidery work frame and may be locked in position, a parallelogram, likewise movable and capable of being locked in position and which is connected to said frame, two arms of the pantograph being each connected by a mechanism to two arms of said parallelogram, each of the two mechanisms comprising a slide mounted on the arm of the pantograph and moved only after the arm of the pantograph has been moved and locked in position, a motion transmitting member connected to said slide and arranged to be locked thereon, the motion transmitting member being connected to the corresponding arm of said parallelogram and moved in consequence of the relative movement of the arm of the pantograph to the locked arm of said parallelogram no matter whether the arm of the pantograph be moved a great or a small amount, after which it is locked to the slide when the latter moves, and in this position without making any idle movement the motion transmitting member then positively moves the released arm of said parallelogram an amount equal to the movement of the arm of the pantograph.

7. The combination with a pantograph having an arm; of a parallelogram arranged to be connected to an element to be moved, two members of the pantograph and two members of the parallelogram having a pivot common to all of them, mechanism for periodically locking the pantograph against movement, mechanism for periodically locking the parallelogram against movement and operating alternately with the first mentioned mechanism, and devices between said members of the pantograph and said members of the parallelogram for directing the movement of the parallelogram to correspond to the angular position of the pantograph while the latter is in locked position.

In testimony that I claim the foregoing as my invention, I have signed my name in presence of two subscribing witnesses.

KARL KELLER.

Witnesses:
   JULIUS P. HEINS,
   AUGUST RUEGG.

---

Copies of this patent may be obtained for five cents each, by addressing the "Commissioner of Patents Washington, D. C."